(12) United States Patent
Wittkopp et al.

(10) Patent No.: US 8,721,491 B2
(45) Date of Patent: May 13, 2014

(54) POWERTRAIN WITH HYBRID TRANSMISSION

(75) Inventors: Scott H. Wittkopp, Ypsilanti, MI (US); Edward W. Mellet, Rochester Hills, MI (US); Shawn H. Swales, Canton, MI (US)

(73) Assignee: GM Global Technology Operation LLC, Detroit, MI (US)

( * ) Notice: Subject to any disclaimer, the term of this patent is extended or adjusted under 35 U.S.C. 154(b) by 211 days.

(21) Appl. No.: 13/211,367

(22) Filed: Aug. 17, 2011

(65) Prior Publication Data

US 2013/0045826 A1 Feb. 21, 2013

(51) Int. Cl.
*F16H 3/44* (2006.01)

(52) U.S. Cl.
USPC .............................. 475/280; 475/5

(58) Field of Classification Search
USPC ............................ 475/5, 275–291
See application file for complete search history.

(56) References Cited

U.S. PATENT DOCUMENTS

| 8,029,404 | B2* | 10/2011 | Borgerson | 475/280 |
| 2006/0240929 | A1* | 10/2006 | Raghavan et al. | 475/5 |
| 2007/0032327 | A1* | 2/2007 | Raghavan et al. | 475/5 |
| 2007/0129196 | A1* | 6/2007 | Bucknor et al. | 475/5 |
| 2012/0122622 | A1* | 5/2012 | Turnbull et al. | 475/5 |

* cited by examiner

*Primary Examiner* — Roger Pang
*Assistant Examiner* — Huan Le
(74) *Attorney, Agent, or Firm* — Quinn Law Group, PLLC

(57) ABSTRACT

A powertrain has an input member, an output member, a stationary member, and a motor/generator. The powertrain includes a hybrid transmission with a first and a second planetary gear set. In some embodiments, a third planetary gear set is added. The motor/generator is continuously connected for common rotation with the first member of the second planetary gear set. A first interconnecting member continuously connects the second member of the first planetary gear set for common rotation with the third member of the second planetary gear set. A second interconnecting member continuously connects the third member of the first planetary gear set for common rotation with the second member of the second planetary gear set. A torque-transmitting mechanism is selectively engageable to connect the first member of the second planetary gear set for common rotation with the input member.

17 Claims, 2 Drawing Sheets

|   | 50 | 52 | 54 | 56 | 58 |
|---|---|---|---|---|---|
| 90 | X |   | X |   |   |
| 92 |   |   |   |   |   |
| 1 |   |   | X |   | X |
| 2 |   | X |   |   | X |
| 3 | X |   |   |   | X |
| 4 |   |   |   | X | X |
| 5 | X |   |   | X |   |
| 6 |   | X |   | X |   |

| | 150 | 152 | 154 | 156 | 158 |
|---|---|---|---|---|---|
| 90 | | X | | | X |
| 92 | | | | | |
| 1 | | | X | | X |
| 2 | | | X | X | |
| 3 | | | | X | X |
| 4 | X | | | X | |

US 8,721,491 B2

POWERTRAIN WITH HYBRID TRANSMISSION

TECHNICAL FIELD

The invention relates to a powertrain having a hybrid transmission. More specifically, the hybrid transmission has a motor/generator connected for rotation with a member of a planetary gear and an input member that is selectively connectable to the same member.

BACKGROUND

A powertrain with an electrically-variable transmission (EVT) typically has an input member, an output member, and two electric motor/generators connected to different members of planetary gear sets. Selectively engageable torque-transmitting mechanisms allow one or more electrically-variable modes of operation, fixed speed ratio modes, and an electric-only (battery-powered) mode. EVTs may improve vehicle fuel economy in a variety of ways, primarily by using one or both of the motor/generators for vehicle braking and using the regenerated energy to power the vehicle electrically, with the engine off. The engine may be turned off at idle, during periods of deceleration and braking, and during periods of low speed or light load operation to eliminate efficiency losses due to engine drag. Braking energy captured via regenerative braking (or electrical energy generated during periods when the engine is operating) is utilized during these engine-off periods. Transient demand for engine torque or power is supplemented by the motor/generators during operation in engine-on modes, allowing for a smaller engine without reducing vehicle performance. Additionally, the electrically-variable modes may allow the engine to be operated at or near the optimal efficiency point for a given power demand.

SUMMARY

A powertrain has an input member, an output member, a stationary member, and a motor/generator. The powertrain includes a hybrid transmission with a first and a second planetary gear set, each having a first member, a second member, and a third member. In some embodiments, a third planetary gear set is added. The motor/generator is continuously connected for common rotation with the first member of the second planetary gear set. A first interconnecting member continuously connects the second member of the first planetary gear set for common rotation with the third member of the second planetary gear set. A second interconnecting member continuously connects the third member of the first planetary gear set for common rotation with the second member of the second planetary gear set. A plurality of torque-transmitting mechanisms are each selectively engageable to connect a different one of the members of the planetary gear sets for common rotation with one of the input member, the stationary member, or with another of the members of the planetary gear sets. One of the torque-transmitting mechanisms is a first clutch selectively engageable to connect the first member of the second planetary gear set for common rotation with the input member.

The powertrain provides a compact arrangement with packaging of a motor/generator adjacent the gear sets and sharing a common axis of rotation as the engine and input member. Multiple forward speed ratios, hybrid operating modes, and electric-only operating modes are available to enable smooth and efficient powertrain operation.

The above features and advantages and other features and advantages of the present invention are readily apparent from the following detailed description of the best modes for carrying out the invention when taken in connection with the accompanying drawings.

DETAILED DESCRIPTION

Figures 1, 2:
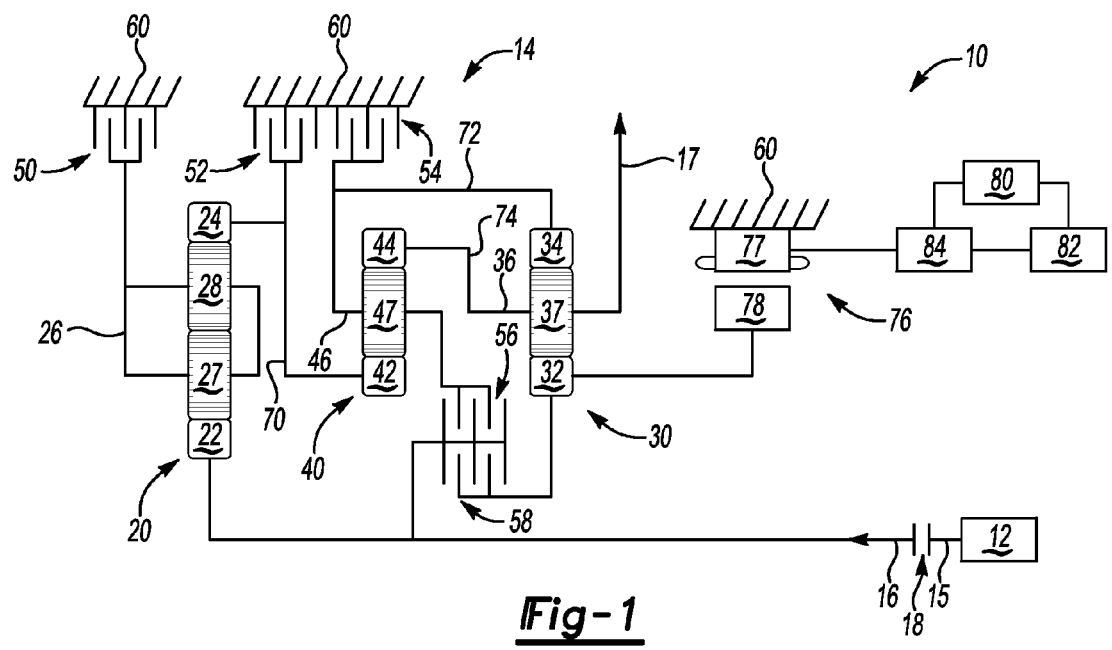
FIG. 1 is a schematic illustration in stick diagram form of a first embodiment of a powertrain with a hybrid transmission.
FIG. 2 is a table indicating the engagement status of torque-transmitting mechanisms of the transmission of FIG. 1 to establish six forward speed ratios and a reverse speed ratio between an input member and an output member of the transmission.

Referring to the drawings, wherein like reference numbers refer to like components, FIG. 1 shows a first embodiment of a powertrain 10 having an engine 12 and a hybrid transmission 14. The hybrid transmission 14 has an input member 16 and an output member 17. The engine 12 has an engine output member 15, such as a crankshaft, that is selectively connectable and disconnectable from the input member 16 by engagement and disengagement of an engine disconnect clutch 18. The engine disconnect clutch 18 is optional, as the transmission 14 would still provide the desired operating modes if the engine 12 were continuously connected for rotation with the input member 16.

The hybrid transmission 14 has three planetary gear sets 20, 30 and 40. The planetary gear set 40 is referred to herein as the first planetary gear set, the planetary gear set 30 is referred to herein as the second planetary gear set and the planetary gear set 20 is referred to herein as the third planetary gear set.

The planetary gear set 20 has a sun gear member 22, a ring gear member 24, and a carrier member 26. The carrier member 26 rotatably supports a first set of pinion gears 27 that mesh with both the sun gear member 22 and the second set of pinion gears 28. The pinion gears 28 mesh with the ring gear member 24. As used herein, the sun gear member 22 is the first member of the third planetary gear set 20, the carrier member 26 is the second member of the third planetary gear set 20, and the ring gear member 24 is the third member of the third planetary gear set 20.

The planetary gear set 30 has a sun gear member 32, a ring gear member 34, and a carrier member 36 that rotatably supports a set of pinion gears 37 that mesh with both the sun gear member 32 and the ring gear member 34. As used herein, the sun gear member 32 is the first member of the second planetary gear set 30, the carrier member 36 is the second member of the second planetary gear set 30, and the ring gear member 34 is the third member of the second planetary gear set 30. The output member 17 is continuously connected for common rotation with the carrier member 36.

The planetary gear set 40 has a sun gear member 42, a ring gear member 44, and a carrier member 46 that rotatably supports a set of pinion gears 47 that mesh with both the sun gear member 42 and the ring gear member 44. As used herein, the sun gear member 42 is the first member of the first planetary gear set 40, the carrier member 46 is the second member of the first planetary gear set 40, and the ring gear member 44 is the third member of the first planetary gear set 40.

An interconnecting member 70, such as a hub, continuously connects the ring gear member 24 for common rotation with the sun gear member 42. As used herein "common rotation" means rotation at the same speed, including a speed of zero (i.e., stationary). An interconnecting member 72 continuously connects the carrier member 46 for common rotation with the ring gear member 34. An interconnecting member 74 continuously connects the ring gear member 44 for common rotation with the carrier member 36. As used herein, the interconnecting member 72 is referred to as the first interconnecting member, the interconnecting member 74 is referred to as the second interconnecting member, and the interconnecting member 70 is referred to as the third interconnecting member.

The hybrid transmission 14 has five torque-transmitting mechanisms that include three brakes 50, 52, 54 and two clutches 56, 58. Brake 50 is selectively engageable to connect the carrier member 26 to a stationary member 60 (i.e., a non-rotating member), such as the transmission housing. Brake 52 is selectively engageable to connect the interconnected ring gear member 24 and the sun gear member 42 to the stationary member 60. Brake 54 is selectively engageable to connect the interconnected carrier member 46 and ring gear member 34 to the stationary member 60. The brakes 50, 52, 54 are referred to herein as a first brake, a second brake, and a third brake, respectively. Clutch 56 is selectively engageable to connect the input member 16 for common rotation with the interconnected carrier member 46 and the ring gear member 34. Clutch 58 is selectively engageable to connect the input member 16 for common rotation with the sun gear member 32. As used herein, clutch 58 is a first clutch and clutch 56 is a second clutch.

A motor/generator 76 includes a stator connected to the stationary member 60 and a rotor 78 connected for common rotation with the sun gear member 32. The stator 77 is operatively connected to an energy storage device 80 that may be one or more batteries. Other electric storage devices that have the ability to store electric power and dispense electric power may be used in place of the batteries. A controller 82 operatively connected to the motor/generator 76 monitors the speed of the rotor 78 and receives information regarding engine speed, either from a separate engine controller, or by connection to the engine 12. Based on this and other vehicle operating conditions, such as driver accelerator input, the controller 82 is operable to provide electrical energy from the energy storage device 80 through a power inverter 84 to the motor/generator 76 to cause the motor/generator 76 to function as a motor, adding torque to the transmission 14. The power inverter 84 converts direct current to alternating current when electrical power is provided to the motor/generator 76. If the information received by the controller 82 indicates that the motor/generator 76 should be operated as a generator, converting mechanical energy into electrical energy, the controller 82 is operable to cause the power inverter 84 to convert alternating current provided from the motor/generator 76 into direct current stored in the energy storage device 80.

FIG. 2 is a table indicating the engagement status of each of the brakes 50, 52, 54 and clutches 56, 58 to establish six different fixed forward speed ratios between the input member 16 and the output member 17 referred to as 1, 2, 3, 4, 5, 6, with the speed of the output member 17 increasing from speed ratio 1 to speed ratio 6. In FIG. 2, an "X" indicates that the brake or clutch represented by the column is engaged. A first forward speed ratio 1 is established by engagement of brake 54 and clutch 58. A second forward speed ratio 2 is established by engagement of brake 52 and clutch 58. A third forward speed ratio 3 is established by engagement of brake 50 and clutch 58. A fourth forward speed ratio is established by engagement of clutch 56 and clutch 58. A fifth forward speed ratio is established by engagement of brake 50 and clutch 56. A sixth forward speed ratio 6 is established by engagement of brake 52 and clutch 56.

Shifts between adjacent ones of the speed ratios of FIG. 2 are single transition shifts, as one torque-transmitting mechanism remains engaged while one torque-transmitting mechanism is released and another is engaged to accomplish the shift. In each of the speed ratios 1-6 and a reverse speed ratio 90, the sun gear member 32 is always rotating, which means the motor/generator 76 is always rotating. That is, the rotor 78 of the motor/generator 76 is never braked. Accordingly, in any of the clutch engagement combinations of FIG. 2, the motor/generator 76 may be operated as a motor or as a generator to adjust torque at the sun gear member 32 and thereby at the output member 17 as well. Furthermore, in the speed ratios 5 and 6 of FIG. 2, the rotor 78 of the motor/generator 76 is rotating freely when the motor/generator 76 is not powered because neither brake 54 nor clutch 58 is engaged and the planetary gear set 30 is inactive. This allows addition or subtraction of torque at the sun gear member 32 by operation of the motor/generator 76 as a motor or as a generator when the torque-transmitting mechanisms are engaged as in the speed ratios 5 or 6 and the motor/generator 76 is powered.

FIG. 2 also indicates a reverse speed ratio 90 established by engagement of the first brake 50 and the third brake 54 to establish rotation of the output member 17 in a reverse direction of the rotation of the input member 16. Row 92 of FIG. 2 indicates a neutral state of the transmission 16 in which no torque-transmitting mechanisms are engaged and torque is not transferred from the input member 16 to the output member 17.

When the engine disconnect clutch 18 is engaged, the engine 12 is on, and the motor/generator 76 is not powered, the speed ratios indicated in FIG. 2 will be fixed speed ratios with torque supplied only by the engine 12. Several other hybrid operating modes may also be established by the powertrain 10. For example, if the engine disconnect clutch 18 is not engaged, so that the engine 12 is disconnected from the transmission 14, the motor/generator 76 maybe controlled to function as a motor to establish electric-only operating modes in which only the motor/generator 76 provides torque.

The powertrain 10 may be launched either in forward or in reverse in an electric-only operating mode. For an electric-only forward launch in which the output member 17 rotates in a forward direction with torque supplied only by the motor/generator 76, only the brake 54 is engaged and the motor/generator 76 is operated as a motor powered by the energy storage device 80. Only the planetary gear set 30 is active. If an engine disconnect clutch 18 was not provided, the launch would not cause the engine 12 to turn. For an electric-only launch in reverse, only the brake 54 is engaged and the motor/generator 76 is operated as a motor rotating in a reverse direction of rotation (i.e., the opposite direction of rotation than that used for forward launch). The engine disconnect clutch 18 is not engaged and the engine 12 is off.

After the electric-only forward launch, the torque-transmitting mechanism engagement schedule for the forward speeds 1, 2, 3, of FIG. 2 may be implemented with only the motor/generator 76 providing torque to provide a first, a second, and a third mode of electric-only forward propulsion. If no engine disconnect clutch 18 is provided, then only the engagement schedule for the first and second forward speeds may be implemented in electric-only operation. After operation through the first and second speed ratios 1, 2, in electric-only operation, a single transition shift may be made to the third speed ratio 3 by disengaging brake 50 and engaging brake 52 while clutch 58 remains engaged, and then engaging the engine disconnect clutch 18 to establish a hybrid operating mode, which may be referred to as an electric torque-converter mode, in which both the engine 12 and the motor/generator 76 provide torque at the sun gear member 32 to power the transmission 14. The engagement schedule for the third through sixth forward speed ratios shown in FIG. 2 may then be established to operate in hybrid operating modes through these speed ratios, with both the engine 12 and the motor/generator 76 providing torque. Shifting between the speed ratios 3-6 of the forward hybrid operating modes is accomplished by single transition shifts, as is evident from FIG. 2, but the motor/generator 76 may be controlled to slew the speed of the sun gear member 32. This may enable the use of a low-loss clutch for clutch 56, such as a dog clutch, that can be engaged synchronously. Use of a dog clutch reduces spin losses and other energy losses associated with hydraulically-engageable clutches.

Forward launch of the powertrain 10 may also be accomplished in a hybrid operating mode with the brake 50 and clutch 58 engaged as indicated in the third forward speed 3 of FIG. 2, and the engine disconnect clutch 18 also engaged with the engine on and the motor/generator 76 acting as a motor or as a generator as necessary to adjust the speed of the output member 17. The transmission 14 may then progress through the forward speed ratios 3-6 of FIG. 2 with both the engine 12 and the motor/generator 76 providing torque to establish additional hybrid operating modes.

Reverse launch of the powertrain 10 may be accomplished in a hybrid operating mode with the brakes 50 and 54 engaged as indicated in the reverse speed ratio 90 of FIG. 2, and the engine disconnect clutch 18 engaged with the engine 12 on and the motor/generator 76 acting as a motor or as a generator as necessary to adjust the speed of the output member 17.

While operating in the hybrid operating modes with engagement of the torque-transmitting mechanisms establishing any of the speed ratios 3-6 of FIG. 2, the powertrain 10 may be shifted to an electric-only operating mode with a synchronous shift. Similarly, while operating in the electric-only operating mode with the brake 52 and clutch 58 engaged to establish the second forward speed ratio 2 of FIG. 2, the powertrain 10 may be shifted to a hybrid operating mode with the engine 12 on and the engine disconnect clutch 18 engaged by disengaging brake 52 and engaging brake 50.

Because only one motor/generator 76 is provided in the powertrain 10, the energy storage device 80 will need to be recharged by controlling the motor/generator 76 to operate as a generator. If the state of charge of the energy storage device 80 is too low to launch the powertrain 10 in a forward, electric-only launch, either brake 54 or clutch 58 may be engaged with the engine 12 on and the motor/generator 76 operated as a generator and the other of brake 54 or clutch 58 slipping to allow the motor/generator 76 to receive torque to recharge the energy storage device 80. Alternately, the powertrain 10 may be launched with the brake 50 and clutch 58 engaged to establish the third speed ratio 3 of FIG. 2, with the motor/generator 76 controlled to function as a generator to receive torque for recharging the energy storage device 80. If the energy storage device 80 has a low state of charge and launch in the reverse direction is desired, either brake 50 or clutch 54 may be engaged with the engine 12 on and the motor/generator 76 operated as a generator and the other of brake 50 or clutch 58 slipping to allow the motor/generator 76 to receive torque to recharge the energy storage device 80. Alternately, the powertrain 10 may be launched with the brake 50 and brake 58 engaged to establish the third speed ratio 3 of FIG. 2, with the motor/generator 76 controlled to function as a generator to receive torque for recharging the energy storage device 80.

Figures 3, 4:
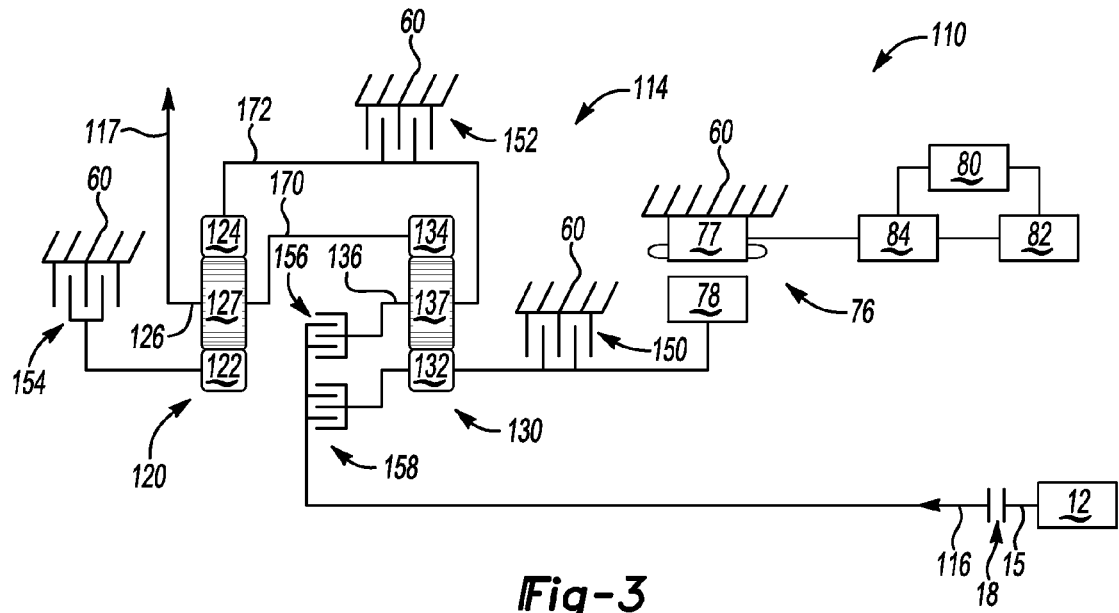
FIG. 3 is a schematic illustration in stick diagram form of a second embodiment of a powertrain with a hybrid transmission.
FIG. 4 is a table indicating the engagement status of torque-transmitting mechanisms of the transmission of FIG. 3 to establish four forward speed ratios and a reverse speed ratio between an input member and an output member of the transmission.

Referring to FIG. 3, a second embodiment of a powertrain 110 has many of the same components as the hybrid powertrain 10 of FIG. 1, but has only two planetary gear sets 120, 130. The planetary gear set 120 is referred to herein as a first planetary gear set and the planetary gear set 130 is referred to herein as a second planetary gear set.

The first planetary gear set 120 has a sun gear member 122, a ring gear member 124, and a carrier member 126. The carrier member 126 rotatably supports a set of pinion gears 127 that mesh with both the sun gear member 122 and the ring gear member 124. As used herein, the sun gear member 122 is the first member of the first planetary gear set 120, the carrier member 126 is the second member of the first planetary gear set 120, and the ring gear member 124 is the third member of the first planetary gear set 120. The output member 117 is continuously connected for common rotation with the carrier member 126.

The second planetary gear set 130 has a sun gear member 132, a ring gear member 134, and a carrier member 136 that rotatably supports a set of pinion gears 137 that mesh with both the sun gear member 132 and the ring gear member 134. As used herein, the sun gear member 132 is the first member of the second planetary gear set 130, the carrier member 136 is the second member of the second planetary gear set 130, and the ring gear member 134 is the third member of the second planetary gear set 130.

An interconnecting member 170 continuously connects the carrier member 126 for common rotation with the ring gear member 134. An interconnecting member 172, such as a hub, continuously connects the ring gear member 124 for common rotation with the carrier member 136. As used herein, the interconnecting member 170 is referred to as the first interconnecting member, and the interconnecting member 172 is referred to as the second interconnecting member.

The hybrid transmission 114 has five torque-transmitting mechanisms that include three brakes 150, 152, 154 and two clutches 156, 158. Brake 150 is selectively engageable to connect the sun gear member 132 and the rotor 78 to the stationary member 60. Brake 152 is selectively engageable to connect the interconnected ring gear member 124 and the carrier member 136 to the stationary member 60. Brake 154 is selectively engageable to connect the sun gear member 122 to the stationary member 60. The brakes 150, 152, 154 are referred to herein as a first brake, a second brake, and a third brake, respectively. Clutch 156 is selectively engageable to connect the input member 116 for common rotation with the interconnected carrier member 136 and the ring gear member 124. Clutch 158 is selectively engageable to connect the input member 116 for common rotation with the sun gear member 132. As used herein, clutch 158 is a first clutch and clutch 156 is a second clutch.

FIG. 4 is a table indicating the engagement status of each of the brakes 150, 152, 154 and clutches 156, 158 to establish four different fixed forward speed ratios between the input member 116 and the output member 117 referred to as 1, 2, 3, 4, with the speed of the output member 117 increasing from speed ratio 1 to speed ratio 4. In FIG. 4, an "X" indicates that the brake or clutch represented by the column is engaged. A first forward speed ratio 1 is established by engagement of brake 154 and clutch 158. A second forward speed ratio 2 is established by engagement of brake 154 and clutch 156. A third forward speed ratio 3 is established by engagement of clutch 156 and clutch 158. A fourth forward speed ratio is established by engagement of brake 150 and clutch 156. Shifts between adjacent ones of the speed ratios of FIG. 4 are single transition shifts, as one torque-transmitting mechanism remains engaged while one torque-transmitting mechanism is released and another is engaged to accomplish the shift.

FIG. 4 also indicates a reverse speed ratio 90 established by engagement of the brake 152 and the clutch 158 to establish rotation of the output member 117 in a reverse direction of the rotation of the input member 116. Row 92 of FIG. 4 indicates a neutral state of the transmission 114 in which torque is not transferred from the input member 116 to the output member 117.

When the engine disconnect clutch 18 is engaged, the engine 12 is on, and the motor/generator 76 is not powered, the speed ratios indicated in FIG. 4 will be fixed speed ratios with torque supplied only by the engine 12. Several other hybrid operating modes may also be established by the powertrain 110. For example, if the engine disconnect clutch 18 is not engaged, so that the engine 12 is disconnected from the transmission 114, the motor/generator 76 maybe controlled to function as a motor to establish electric-only operating modes in which only the motor/generator 76 provides torque.

The powertrain 110 may be launched either in forward or in reverse in an electric-only operating mode. For an electric-only forward launch in which the output member 117 rotates in a forward direction with torque supplied only by the motor/generator 76, only the brake 154 is engaged and the motor/generator 76 is operated as a motor powered by the energy storage device 80. If an engine disconnect clutch 18 was not provided, the launch would not cause the engine 12 to turn. For an electric-only launch in reverse, only the brake 152 is engaged and the motor/generator 76 is operated as a motor. The engine disconnect clutch 18 is not engaged and the engine 12 is off.

After the electric-only forward launch, the torque-transmitting mechanism engagement schedule for the forward speeds 1, 2, 3, of FIG. 4 may be implemented with only the motor/generator 76 providing torque to provide a first, a second, and a third mode of electric-only forward propulsion. The engine disconnect clutch 18 should be engaged at least for the third mode of electric-only operation. Single transition shifts are made between the electric-only operating modes. From the electric-only mode in the third speed ratio 3, a synchronous shift may be made to the second electric-only operating mode with the second speed ratio 2 by disengaging the first clutch 158 and engaging the third brake 154 while clutch 156 remains engaged, and then engaging the engine disconnect clutch 18 to establish a hybrid operating mode, which may be referred to as an electric torque-converter mode, in which both the engine 12 and the motor/generator 76 provide torque through the planetary gear sets 120, 130 to power the transmission 114. The engagement schedule for the third through fourth forward speed ratios shown in FIG. 4 may then be established to operate in hybrid operating modes through these speed ratios, with both the engine 12 and the motor/generator 76 providing torque. Shifting between the speed ratios 3-4 of the forward hybrid operating modes is accomplished by a single transition shift, as is evident from FIG. 4, but the motor/generator 76 may be controlled to slew the speed of the sun gear member 132. This may enable the use of a low-loss clutch for clutch 158, such as a dog clutch, that can be engaged synchronously. A shift from one of the hybrid operating modes to one of the electric-only operating modes may be accomplished with the torque-transmitting mechanisms engaged in the third forward speed ratio of FIG. 4 (i.e., clutches 156 and 158 engaged) and the engine disconnect clutch 18 then disengaged.

Forward launch of the powertrain 110 may also be accomplished in a hybrid operating mode with the brake 154 and clutch 156 engaged as indicated in the second forward speed 2 of FIG. 4, and the engine disconnect clutch 18 also engaged with the engine 12 on and the motor/generator 76 acting as a motor or as a generator as necessary to adjust the speed of the output member 117. The transmission 114 may then progress through the forward speed ratios 3-4 of FIG. 4 with both the engine 12 and the motor/generator 76 providing torque to establish additional hybrid operating modes.

Because only one motor/generator 76 is provided in the powertrain 110, the energy storage device 80 will need to be recharged by controlling the motor/generator 76 to operate as a generator. If the state of charge of the energy storage device 80 is too low to launch the powertrain 110 in a forward, electric-only launch, either brake 154 or clutch 158 may be engaged and the other of brake 154 or clutch 158 slipping, or both brake 154 and clutch 156 may be engaged, with the engine 12 on and the motor/generator 76 operated as a generator to allow the motor/generator 76 to receive torque to recharge the energy storage device 80. If the energy storage device 80 has a low state of charge and launch in the reverse direction is desired, either brake 152 or clutch 158 may be engaged with the engine 12 on and the motor/generator 76 operated as a generator and the other of brake 152 or clutch 158 slipping to allow the motor/generator 76 to receive torque to recharge the energy storage device 80.

While the best modes for carrying out the invention have been described in detail, those familiar with the art to which this invention relates will recognize various alternative designs and embodiments for practicing the invention within the scope of the appended claims.

The invention claimed is:
1. A powertrain comprising:
an input member; an output member; a stationary member; a motor/generator;
a first and a second planetary gear set, each having a first member, a second member, and a third member; wherein the motor/generator is continuously connected for common rotation with the first member of the second planetary gear set;
a first interconnecting member continuously connecting the second member of the first planetary gear set for common rotation with the third member of the second planetary gear set;
a second interconnecting member continuously connecting the third member of the first planetary gear set for common rotation with the second member of the second planetary gear set;
a plurality of torque-transmitting mechanisms each selectively engageable to connect a different one of the members of the planetary gear sets for common rotation with one of the input member, the stationary member, or with another of the members of the planetary gear sets; wherein one of the torque-transmitting mechanisms is a first clutch selectively engageable to connect the first member of the second planetary gear set for common rotation with the input member;

wherein the first clutch is axially between the first and the second planetary gear sets, and the second planetary gear set is axially between the motor/generator and the first clutch; and wherein the torque-transmitting mechanisms are selectively engageable in different combinations of only two to provide at least four fixed forward speed ratios and a reverse speed ratio between the input member and the output member.

2. The powertrain of claim 1, wherein the first member, the second member, and the third member of each of the planetary gear sets are a sun gear member, a carrier member, and a ring gear member, respectively.

3. The powertrain of claim 1, wherein the motor/generator spins freely without torque in at least one of said at least four forward speed ratios.

4. The powertrain of claim 1, wherein the motor/generator is spinning in each of said at least four forward speed ratios.

5. The powertrain of claim 1, further comprising:
an engine operatively connected to the input member; wherein one of said plurality of torque-transmitting mechanisms is a brake that is selectively engageable to connect the third member of the first planetary gear set and the second member of the second planetary gear set to the stationary member; wherein an electric-only launch mode is provided when only said brake is engaged, the engine is off, and the motor/generator is controlled to function as a motor.

6. The powertrain of claim 1, further comprising:
an engine operatively connected to the input member; wherein a hybrid launch mode is established when the engine is on, the motor/generator is operated as a motor or as a generator, and the torque-transmitting mechanisms are engaged according to one of said combinations of two.

7. The powertrain of claim 1, further comprising:
an engine operatively connected to the input member; wherein the engine is on and the motor/generator is controlled to vary the speed of the first member of the second planetary gear set during shifts between at least some of said at least four forward speed ratios.

8. The powertrain of claim 1, further comprising:
an engine operatively connected to the input member and an energy storage device operatively connected to the motor/generator; wherein the engine is on to launch the output member when at least one of said torque-transmitting mechanisms is engaged and the motor is controlled to function as a generator to recharge the energy storage device.

9. The powertrain of claim 1, further comprising:
an engine; and
an additional torque-transmitting mechanism selectively connecting the engine to the input member.

10. The powertrain of claim 1, wherein the plurality of torque-transmitting mechanisms further include:
a first brake selectively engageable to connect the first member of the second planetary gear set to the stationary member;
a second brake selectively engageable to connect the third member of the first planetary gear set and the second member of the second planetary gear set to the stationary member;
a third brake selectively engageable to connect the first member of the first planetary gear set to the stationary member;
a second clutch selectively engageable to connect the input member for common rotation with the second member of the second planetary gear set and with the third member of the first planetary gear set; and
wherein the output member is continuously connected for common rotation with the second member of the first planetary gear set.

11. The transmission of claim 1, further comprising:
a third planetary gear set having a ring gear member, a sun gear member and a carrier member that rotatably supports a first set of pinion gears and a second set of pinion gears; wherein the first set of pinion gears mesh with the sun gear member and with the second set of pinion gears; wherein the second set of pinion gears mesh with the ring gear member;
a third interconnecting member continuously connecting the ring gear member of the third planetary gear set for common rotation with the first member of the first planetary gear set;
wherein the plurality of torque-transmitting mechanisms further include:
a first brake selectively engageable to connect the carrier member of the third planetary gear set to the stationary member;
a second brake selectively engageable to connect the ring gear member of the third planetary gear set and the first member of the first planetary gear set to the stationary member;
a third brake selectively engageable to connect the second member of the first planetary gear set and the third member of the second planetary gear set to the stationary member;
a second clutch selectively engageable to connect the input member for common rotation with the second member of the first planetary gear set and with the third member of the second planetary gear set;
wherein the output member is continuously connected for common rotation with the second member of the second planetary gear set; and
wherein the plurality of torque-transmitting mechanisms are selectively engageable in different combinations of two to provide six forward speed ratios between the input member and the output member.

12. The powertrain of claim 1, further comprising:
an engine operatively connected to the input member; wherein one of said plurality of torque-transmitting mechanisms is a brake that is selectively engageable to connect the second member of the first planetary gear set and the third member of the second planetary gear set to the stationary member; wherein an electric-only launch mode is provided when only said brake is engaged, the engine is off, and the motor/generator is controlled to function as a motor.

13. The powertrain of claim 12, wherein additional electric-only operating modes are established in at least some of the fixed ratio operating modes when the engine is off and the motor/generator is controlled to function as a motor with single transition shifts between the additional electric-only operating modes.

14. The powertrain of claim 1, further comprising:
an engine operatively connected to the input member; wherein one of said plurality of torque-transmitting mechanisms is a brake that is selectively engageable to connect the first member of the first planetary gear set to the stationary member; wherein an electric-only launch mode is provided when only said brake is engaged, the engine is off, and the motor/generator is controlled to function as a motor.

15. The powertrain of claim 14, wherein additional electric-only operating modes are established in at least some of the fixed ratio operating modes when the engine is off and the motor/generator is controlled to function as a motor with single transition shifts between the additional electric-only operating modes.

16. A hybrid transmission comprising:
an input member; an output member; a stationary member; a motor/generator;
a first and a second planetary gear set, each having a sun gear member, a carrier member, and a ring gear member with the carrier member rotatably supporting a set of pinion gears that mesh with both the sun gear member and the ring gear member; wherein the motor/generator is continuously connected for common rotation with the sun gear member of the second planetary gear set; wherein the output member is continuously connected for common rotation with the carrier member of the second planetary gear set;
a third planetary gear set having a ring gear member, a sun gear member and a carrier member that rotatably supports a first set of pinion gears and a second set of pinion gears, wherein the first set of pinion gears of the third planetary gear set mesh with the sun gear member of the third planetary gear set and with the second set of pinion gears of the third planetary gear set, and the second set of pinion gears of the third planetary gear set mesh with the ring gear member of the third planetary gear set;
a first interconnecting member continuously connecting the carrier member of the first planetary gear set for common rotation with the ring gear member of the second planetary gear set;
a second interconnecting member continuously connecting the ring gear member of the first planetary gear set for common rotation with the carrier member of the second planetary gear set;
a third interconnecting member continuously connecting the ring gear member of the third planetary gear set for common rotation with the sun gear member of the first planetary gear set;
a first brake selectively engageable to connect the carrier member of the third planetary gear set to the stationary member;
a second brake selectively engageable to connect the ring gear member of the third planetary gear set and the sun gear member of the first planetary gear set to the stationary member;
a third brake selectively engageable to connect the carrier member of the first planetary gear set and the ring gear member of the second planetary gear set to the stationary member;
a first clutch selectively engageable to connect the input member for common rotation with the sun gear member of the second planetary gear set;
a second clutch selectively engageable to connect the input member for common rotation with the carrier member of the first planetary gear set and with the ring gear member of the second planetary gear set; and
wherein the plurality of torque-transmitting mechanisms are selectively engageable in different combinations of two to provide six forward speed ratios and a reverse speed ratio between the input member and the output member.

17. A hybrid transmission comprising:
an input member; an output member; a stationary member; a motor/generator;
a first and a second planetary gear set, each having a sun gear member, a carrier member, and a ring gear member with the carrier member rotatably supporting a set of pinion gears that mesh with both the ring gear member and the sun gear member; wherein the motor/generator is continuously connected for common rotation with the sun gear member of the second planetary gear set; wherein the output member is continuously connected for common rotation with the carrier member of the first planetary gear set;
a first interconnecting member continuously connecting the carrier member of the first planetary gear set for common rotation with the ring gear member of the second planetary gear set;
a second interconnecting member continuously connecting the ring gear member of the first planetary gear set for common rotation with the carrier member of the second planetary gear set;
a first brake selectively engageable to connect the sun gear member of the second planetary gear set to the stationary member;
a second brake selectively engageable to connect the ring gear member of the first planetary gear set and the carrier member of the second planetary gear set to the stationary member;
a third brake selectively engageable to connect the sun gear member of the first planetary gear set to the stationary member;
a first clutch selectively engageable to connect the input member for common rotation with the sun gear member of the second planetary gear set;
a second clutch selectively engageable to connect the input member for common rotation with the ring gear member of the first planetary gear set and with the carrier member of the second planetary gear set; and
wherein the plurality of torque-transmitting mechanisms are selectively engageable in different combinations of two to provide four forward speed ratios and a reverse speed ratio between the input member and the output member; and
wherein the first and the second clutches are axially between the first and the second planetary gear sets, and the second planetary gear set is axially between the motor/generator and the first and second clutches.

* * * * *